(12) United States Patent
Baroudi et al.

(10) Patent No.: US 9,760,088 B2
(45) Date of Patent: Sep. 12, 2017

(54) METHOD FOR COOPERATIVELY DEPLOYING ROBOTS AND COOPERATIVE SYSTEM OF ROBOTS

(71) Applicant: KING FAHD UNIVERSITY OF PETROLEUM AND MINERALS, Dhahran (SA)

(72) Inventors: Uthman Baroudi, Dhahran (SA); Gamal Sallam, Dhahran (SA)

(73) Assignee: King Fahd University of Petroleum and Minerals, Dharan (SA)

(*) Notice: Subject to any disclaimer, the term of this patent is extended or adjusted under 35 U.S.C. 154(b) by 117 days.

(21) Appl. No.: 15/019,312

(22) Filed: Feb. 9, 2016

(65) Prior Publication Data
US 2017/0227961 A1    Aug. 10, 2017

(51) Int. Cl.
G05D 1/00 (2006.01)
H04W 4/00 (2009.01)
G05D 1/02 (2006.01)
H04L 29/08 (2006.01)

(52) U.S. Cl.
CPC ......... *G05D 1/0088* (2013.01); *G05D 1/0287* (2013.01); *H04L 67/12* (2013.01);
(Continued)

(58) Field of Classification Search
CPC .... G05D 1/0088; G05D 1/0287; G05D 1/104; H04L 67/12; H04W 4/008; Y10S 901/01; Y10S 901/08
See application file for complete search history.

(56) References Cited

U.S. PATENT DOCUMENTS

| | | | |
|---|---|---|---|
| 7,400,598 B1* | 7/2008 | Humphries | H04W 40/20 370/310 |
| 7,966,093 B2* | 6/2011 | Zhuk | G05D 1/0088 700/245 |

(Continued)

OTHER PUBLICATIONS

Jishua Reich and Elizabeth Sklar, Robot-Sensor Networks for Search and Rescue, In Proceedings IEEE International Workshop on Safety, Security and Rescue Robotics, Aug. 2006.*

(Continued)

*Primary Examiner* — Abby Lin
(74) *Attorney, Agent, or Firm* — Oblon, McClelland, Maier & Neustadt, L.L.P.

(57) ABSTRACT

A method and cooperative system for deploying a mobile robot of a plurality of mobile robots with a plurality of fixed sensors. The method includes broadcasting a position-request message including a request for a position and a demand for mobile robots, receiving the position-request message, and transmitting a position-demand message. The method also includes receiving position-demand messages from corresponding fixed sensors, determining a distance to the corresponding fixed sensors, storing information for the corresponding fixed sensor in a fixed sensor list when the distance to the corresponding fixed sensor is less than a predetermined distance, determining a closest fixed sensor, transmitting an association request message to the closest fixed sensor, receiving the association request message, and transmitting a confirmation message when the demand of the closest fixed sensor is not equal to zero or a rejection message when the demand of the closest fixed sensor is equal to zero.

20 Claims, 9 Drawing Sheets

(52) U.S. Cl.
CPC ............ *H04W 4/008* (2013.01); *Y10S 901/01* (2013.01); *Y10S 901/08* (2013.01)

(56) References Cited

U.S. PATENT DOCUMENTS

| | | | |
|---|---|---|---|
| 8,108,071 B2 | 1/2012 | Lin et al. | |
| 8,112,176 B2 | 2/2012 | Solomon | |
| 8,494,689 B1* | 7/2013 | Ashton | G05D 1/104 |
| | | | 318/135 |
| 9,674,684 B1* | 6/2017 | Mendelson | H04W 4/22 |
| 2010/0160744 A1* | 6/2010 | Ha | H04W 4/02 |
| | | | 600/301 |

OTHER PUBLICATIONS

Loscri, V., et al., "Performance Evaluation of Novel Distributed Coverage Techniques for Swarms of Flying Robots", IEEE Wireless Communications and Networkign Conference, URL: https://hal.inria.fr/hal-00920752/document, Total 7 Pages, (Apr. 30, 2014).

Garetto, M., et al., "A Distributed Sensor Relocation Scheme for Environmental Control", IEEE, Total 10 Pages, (2007).

Erdelj, M., et al, "Covering Points of Interest with Mobile Sensors", IEEE Transactions on Parallel and Distributed Systems, vol. 24, No, 1, pp. 32-43, (Jan. 2013).

Roselin, J., et al., "Energy Balanced Dynamic Deployment Optimization to Enhance Reliable Lifetime of Wireless Sensor Network", International Journal of Engineering and Technology (IJET),vol. 5, No. 4, pp. 3450-3460, (Aug. to Sep. 2013).

Zou, Y., et al., "Sensor Deployment and Target Localization Based on Virtual Forces", IEEE, pp. 1293-1303, (2003).

Li, S., et al., "Sensor Deployment Optimization for Detecting Maneuvering Targets", 7th International Conference on Information Fusion (Fusion), pp. 1629-1635, (2005).

Li, X., et al, "Strictly Localized Sensor Self-Deployment for Optimal Focused Coverage", IEEE Transactions on Mobile Computing, vol. 10, No. 11, pp. 1520-1533, (2011).

* cited by examiner

METHOD FOR COOPERATIVELY DEPLOYING ROBOTS AND COOPERATIVE SYSTEM OF ROBOTS

BACKGROUND

Field of the Disclosure

The present disclosure relates to cooperative deployment of mobile robots, and specifically relates to a method for cooperatively deploying mobile robotic sensors among a group of fixed sensors, and a cooperative system of robotics.

Description of Related Art

Robots are used for many military and civilian applications. Many such applications, such as search-and-rescue operations or area monitoring during an environmental disaster, cannot be effectively carried out by a single robot, but rather are carried out by a many robots linked cooperatively in a robotic network.

To build a robotic network, one needs a mechanism to organize the available robots. Further, in many scenarios the mechanism must be capable of functioning without human intervention or assistance. Some works have proposed methods for the distribution of robots, but these have tended to suffer from limitations such as evenly spreading the robots regardless of demand, requiring an a priori known distribution of demand over an area, or requiring centralized coordination of the robots.

SUMMARY

One embodiment of the disclosure is drawn to a method of cooperatively deploying a mobile robot of a plurality of mobile robots with a plurality of fixed sensors. The method includes broadcasting, by the mobile robot of the plurality of mobile robots, a position-request message, the position-request message including a request for a position and a demand for mobile robots, receiving, by a fixed sensor of the plurality of fixed sensors, the position-request message from the mobile robot, and transmitting, by the fixed sensor, a position-demand message to the mobile robot, the position-demand message including the position and the demand for mobile robots, the demand for mobile robots being a number greater than or equal to zero.

The method also includes receiving, by the mobile robot, one or more position-demand messages, each position-demand message being from a corresponding fixed sensor of the plurality of fixed sensors within a range of the position-request message, determining, by the mobile robot, for each of the one or more position-demand messages, a distance to the corresponding fixed sensor, storing, by the mobile robot, for each position-demand message having the demand with a number greater than zero, information for the corresponding fixed sensor in a fixed sensor list when the distance to the corresponding fixed sensor is less than a predetermined distance, determining, by the mobile robot, a closest fixed sensor using the information stored in the fixed sensor list, transmitting, by the mobile robot, an association request message to the closest fixed sensor, receiving, by the closest fixed sensor, the association request message from the mobile robot, and transmitting, by the closest fixed sensor, a confirmation message to the mobile robot when the demand of the closest fixed sensor is not equal to zero, or transmitting, by the closest fixed sensor, a rejection message to the mobile robot when the demand of the closest fixed sensor is equal to zero.

One embodiment of the disclosure is drawn to a cooperative system including a plurality of fixed sensors, each fixed sensor including a transmitter configured to transmit radio-frequency communications, a receiver configured to receive radio-frequency communications, and circuitry, and a plurality of mobile robots, each mobile robot including a transmitter configured to transmit radio-frequency communications, a receiver configured to receive radio-frequency communications, and circuitry.

The circuitry of each fixed sensor is configured to receive a position-request message from a mobile robot of the plurality of mobile robots, the position-request message being a broadcast including a request for a position and a demand for mobile robots, transmit a position-demand message to the mobile robot, the position-demand message including the position and the demand for mobile robots, the demand being a number greater than or equal to zero, receive an association request message from the mobile robot, transmit a confirmation message to the mobile robot when the demand of the fixed sensor is not equal to zero, or transmit a rejection message to the mobile robot when the demand of the fixed sensor is equal to zero.

The circuitry of each mobile robot is configured to broadcast the position-request message, receive one or more position-demand messages, each position-demand message being from a corresponding fixed sensor of the plurality of fixed sensors within a range of the position-request message, determine for each of the one or more position-demand messages, a distance to the corresponding fixed sensor, store, for each position-demand message having the demand with a number greater than zero, information for the corresponding fixed sensor in a fixed sensor list when the distance to the corresponding fixed sensor is less than a predetermined distance, determine a closest fixed sensor using the information stored in the fixed sensor list, and transmit the association request message to the closest fixed sensor.

BRIEF DESCRIPTION OF THE DRAWINGS

A more complete appreciation of the disclosed embodiments and many of the attendant advantages thereof will be more readily obtained by reference to the accompanying drawings when considered in connection with following detailed description.

DETAILED DESCRIPTION

Figure 1:
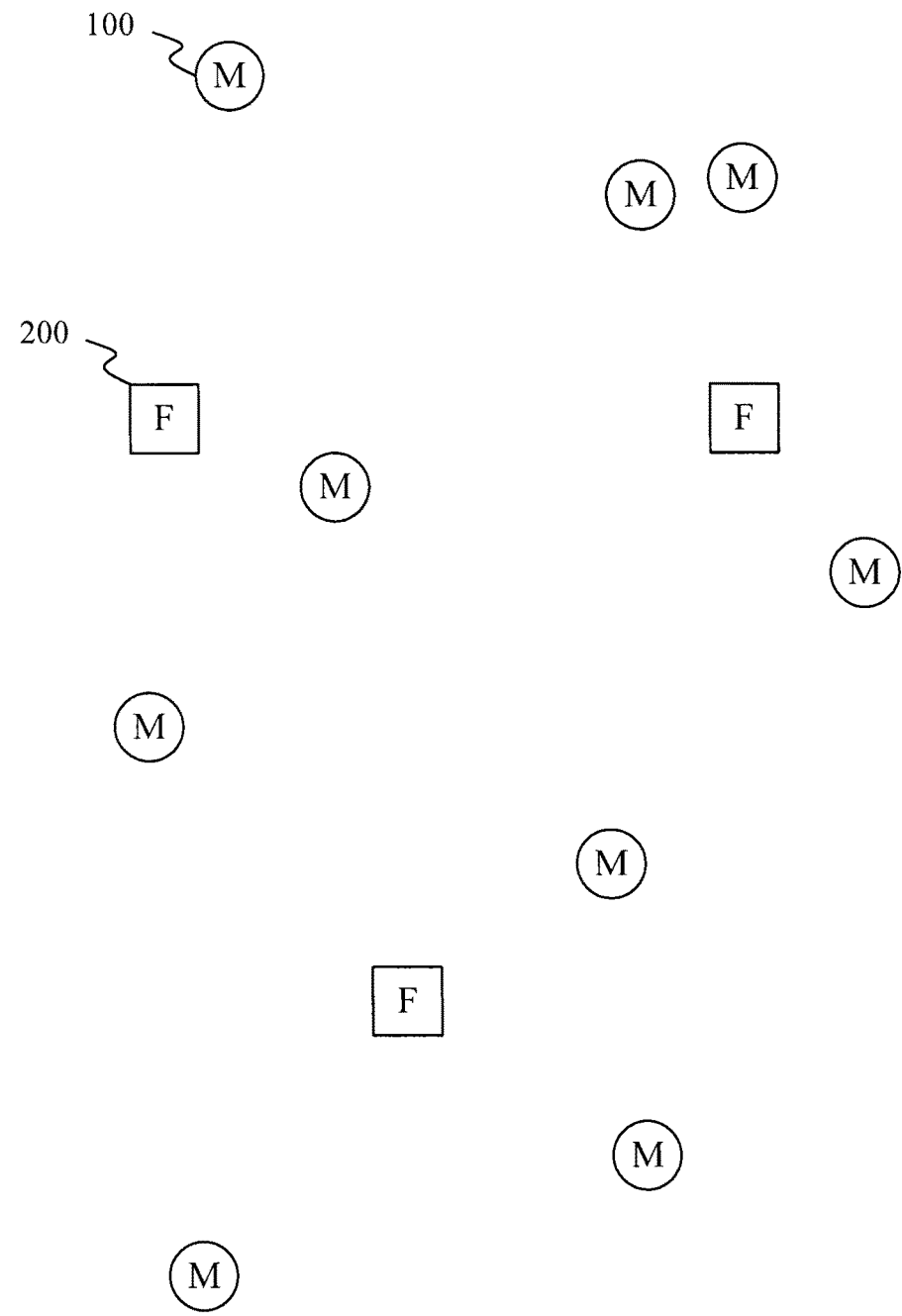
FIG. 1 illustrates a distribution of mobile robots and fixed sensors.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

One embodiment of the disclosure is drawn to a method of cooperatively deploying a mobile robot of a plurality of mobile robots with a plurality of fixed sensors. The method includes broadcasting, by the mobile robot of the plurality of mobile robots, a position-request message, the position-request message including a request for a position and a demand for mobile robots, receiving, by a fixed sensor of the plurality of fixed sensors, the position-request message from the mobile robot, transmitting, by the fixed sensor, a position-demand message to the mobile robot, the position-demand message including the position and the demand for mobile robots, the demand for mobile robots being a number greater than or equal to zero, receiving, by the mobile robot, one or more position-demand messages, each position-demand message being from a corresponding fixed sensor of the plurality of fixed sensors within a range of the position-request message, determining, by the mobile robot, for each of the one or more position-demand messages, a distance to the corresponding fixed sensor, storing, by the mobile robot, for each position-demand message having the demand with a number greater than zero, information for the corresponding fixed sensor in a fixed sensor list when the distance to the corresponding fixed sensor is less than a predetermined distance, determining, by the mobile robot, a closest fixed sensor using the information stored in the fixed sensor list, transmitting, by the mobile robot, an association request message to the closest fixed sensor, receiving, by the closest fixed sensor, the association request message from the mobile robot, and transmitting, by the closest fixed sensor, a confirmation message to the mobile robot when the demand of the closest fixed sensor is not equal to zero, or transmitting, by the closest fixed sensor, a rejection message to the mobile robot when the demand of the closest fixed sensor is equal to zero.

In one embodiment, the method further includes determining, by the fixed sensor, a demand of a neighboring fixed sensor of the plurality of fixed sensors, wherein, in the transmitting by the fixed sensor, the position-demand message corresponds to the fixed sensor when the demand of the fixed sensor is greater than zero, and the position-demand message corresponds to the neighboring fixed sensor when the demand of the fixed sensor is equal to zero.

In one embodiment, the method further includes receiving, by the fixed sensor, a position-demand message from the neighboring fixed sensor, wherein the demand of the neighboring fixed sensor is determined from the position-demand message from the neighboring fixed sensor.

In one embodiment, the method further includes monitoring, by each of the plurality of fixed sensors, a respective local area, calculating, by each of the plurality of fixed sensors, a number of mobile robots required according to a result of the monitoring of the respective local area and a predetermined algorithm, and determining, by each of the plurality of fixed sensors, a demand that is a difference between the number of mobile robots required as determined by the calculating by each of the plurality of fixed sensors and a number of mobile robots associated with each of the plurality of fixed sensors, respectively.

In one embodiment, the method further includes receiving, by the mobile robot, the rejection message from the fixed sensor, determining, by the mobile robot, a next closest fixed sensor using the information stored in the fixed sensor list, and transmitting, by the mobile robot, an association request message to the next closest fixed sensor.

In one embodiment, the method further includes obtaining, by the mobile robot, a demand of a first fixed sensor of the plurality of fixed sensors and a demand of a second fixed sensor of the plurality of fixed sensors, receiving, by the mobile robot, a position-request message from another mobile robot of the plurality of mobile robots, and transmitting, by the mobile robot, a position-request reply message according to the demand of the first fixed sensor and the demand of the second fixed sensor.

In one embodiment, the method further includes determining, by the mobile robot, a fixed sensor having a greatest demand from the first fixed sensor and the second fixed sensor, and transmitting, by the mobile robot, a position-demand message corresponding to the fixed sensor having the greatest demand.

In one embodiment, the method further includes calculating, by the mobile robot, a direction based on the one or more position-demand messages, and moving the mobile robot in the calculated direction.

In one embodiment, the method further includes calculating, by the mobile robot, a distance magnitude based on the one or more position-demand messages, and moving the mobile robot for the calculated distance magnitude and in the calculated direction.

In one embodiment, in the storing, the predetermined distance is proportional to a communication range of the mobile robot.

One embodiment of the disclosure is drawn to a cooperative system including a plurality of fixed sensors, each fixed sensor including: a transmitter configured to transmit radio-frequency communications, a receiver configured to receive radio-frequency communications, and circuitry, and a plurality of mobile robots, each mobile robot including: a transmitter configured to transmit radio-frequency communications, a receiver configured to receive radio-frequency communications, and circuitry. The circuitry of each fixed sensor is configured to receive a position-request message from a mobile robot of the plurality of mobile robots, the position-request message being a broadcast including a request for a position and a demand for mobile robots, transmit a position-demand message to the mobile robot, the position-demand message including the position and the demand for mobile robots, the demand being a number greater than or equal to zero, receive an association request message from the mobile robot, transmit a confirmation message to the mobile robot when the demand of the fixed sensor is not equal to zero, or transmit a rejection message to the mobile robot when the demand of the fixed sensor is equal to zero. The circuitry of each mobile robot is configured to broadcast the position-request message, receive one or more position-demand messages, each position-demand message being from a corresponding fixed sensor of the plurality of fixed sensors within a range of the position-request message, determine for each of the one or more position-demand messages, a distance to the corresponding fixed sensor, store, for each position-demand message having the demand with a number greater than zero, information for the corresponding fixed sensor in a fixed sensor list when the distance to the corresponding fixed sensor is less than a predetermined distance, determine a closest fixed sensor using the information stored in the fixed sensor list, and transmit the association request message to the closest fixed sensor.

In one embodiment of the cooperative system, the circuitry of each fixed sensor of the plurality of fixed sensors is further configured to determine a demand of a neighboring fixed sensor of the plurality of fixed sensors, wherein the position-demand message transmitted by the circuitry corresponds to the fixed sensor when the demand of the fixed sensor is greater than zero and corresponds to the neighboring fixed sensor when the demand of the fixed sensor is equal to zero.

In one embodiment of the cooperative system, the circuitry of each fixed sensor of the plurality of fixed sensors is further configured to receive a position-demand message from the neighboring fixed sensor, wherein the demand of the neighboring fixed sensor is determined from the position-demand message from the neighboring fixed sensor.

In one embodiment of the cooperative system, the circuitry of each fixed sensor of the plurality of fixed sensors is further configured to monitor a local area to a respective fixed sensor, determine a number of mobile robots required according to results of the monitoring of the local area and a predetermined algorithm, and calculate a demand for the respective fixed sensor that is a difference between the determined number of mobile robots required and a number of mobile robots associated with the respective fixed sensor.

In one embodiment of the cooperative system, the circuitry of each mobile robot of the plurality of mobile robots is further configured to receive the rejection message from the fixed sensor, determine a next closest fixed sensor using the information stored in the fixed sensor list, and transmit an association request message to the next closest fixed sensor.

In one embodiment of the cooperative system, the circuitry of each mobile robot of the plurality of mobile robots is further configured to obtain a demand of a first fixed sensor of the plurality of fixed sensors and a demand of a second fixed sensor of the plurality of fixed sensors, receive a position-request message from another mobile robot of the plurality of mobile robots, and transmit a position-request reply message according to the demand of the first fixed sensor and the demand of the second fixed sensor.

In one embodiment of the cooperative system, the circuitry of each mobile robot of the plurality of mobile robots is further configured to determine a fixed sensor having a greatest demand from the first fixed sensor and the second fixed sensor, and transmit a position-demand message corresponding to the fixed sensor having the greatest demand.

In one embodiment of the cooperative system, the circuitry of each mobile robot of the plurality of mobile robots is further configured to calculate a direction based on the one or more position-demand messages, and cause the mobile robot to move in the calculated direction.

In one embodiment of the cooperative system, the circuitry of each mobile robot of the plurality of mobile robots is further configured to calculate a distance magnitude based on the one or more position-demand messages and cause the mobile robot to move for the calculated distance magnitude and in the calculated direction.

In one embodiment of the cooperative system, the circuitry of each mobile robot of the plurality of mobile robots is configured to store the predetermined distance for the fixed sensor list so that the predetermined distance is proportional to a communication range of the mobile robot.

The problem of deploying mobile robots over an area for which the distribution of need is not known in advance is solved by deploying the mobile robots, also called robots, cooperatively with a collection of fixed sensors, also called landmarks, which remain at a fixed position, monitor a local area, and determine a local demand, or need, for robots.

The fixed sensors may be deployed in the area without any particular restrictions in the present disclosure. In one aspect of the disclosure, the overlap of the detection areas of the fixed sensors is minimized so that the area monitored can be larger, or so that less fixed sensors may be used for a given area. The fixed sensors each determine a demand for the respective area which the fixed sensor is monitoring, but do not necessarily have the demand of the other fixed sensors.

The fixed sensors are configured with radio frequency (RF) communications equipment. The fixed sensors communicate with robots and other fixed sensors using the RF equipment.

The fixed sensors are deployed before there is a need, in order to support the deployment of the mobile robots when a need arises. The fixed sensors monitor an area, and determine a need for the mobile robots in that area after an incident has occurred. The fixed sensors may be equipped with whatever types of sensors or detectors are appropriate for their function, and are not restricted to any particular type of detection mode. For example, the fixed sensors may be equipped with chemical sensors to analyze air or water quality or a gas, liquid, or vapor concentration, toxic gas detectors, water level detectors, seismometers, visibility meters, or other sensors which provide data from which a need for mobile robots can be determined.

A demand, or need, for robots is determined by the fixed sensor from its monitoring of the area around it and a predetermined formula using the results of the monitoring. A number of robots already available to the fixed sensor, if any, will be subtracted from the number of robots calculated from the predetermined formula.

For example, in an aspect of the disclosure for a search-and-rescue scenario on land, a fixed sensor can measure a local visibility using a calibrated source and detector, as in the Automated Surface Observing System (ASOS) units used for meteorological and aviation observation in the United States. A search rate of a mobile robot is determined to be twice the visibility multiplied by the speed of the mobile robot. For example, if the visibility is determined to be 0.5 miles and a mobile robot moves at 10 miles per hour, then the search rate of the mobile robot is 10 square miles per hour (twice the visibility times the speed). The fixed sensor determines the demand using a predetermined formula where the demand is the minimum number of robots required to search the area in a calculated time. For example, if the fixed sensor monitors an area of 100 square miles, the measured visibility is 0.5 miles, the mobile robot moves at 10 miles per hour, and the temperature or weather conditions dictate that the search-and-rescue should be completed in 2 hours, then the fixed sensor calculates the demand of 5 mobile robots.

In an aspect of the disclosure directed to a search-and-rescue scenario at sea, readings such as the current strength and the wave height can be included in the predetermined formula. In an aspect of the disclosure directed to a search-and-rescue scenario due to a gas leak or environmental contamination, a concentration of a chemical or contaminant can be included in the predetermined formula, with a greater concentration of chemical or contaminant indicating a greater need for mobile robots. In an aspect of the disclosure directed to an earthquake scenario, a Richter scale reading can be included in the predetermined formula, with a greater reading on the Richter scale indicating a greater need for robots.

The scenarios discussed hereinabove are not intended to be exhaustive, but rather are illustrative of some different types of predetermined rules. Any predetermined rule based on sensor data may be used by the fixed sensor to determine a demand for mobile robots, as long as the mobile robot demand can be calculated.

Having determined how the demand for robots is distributed over the area via the fixed sensors, we now turn to the cooperative deployment of the robots.

The mobile robots are desired to be spread in response to an event. The mobile robots each have a capability, via some sensor, system or payload, which is relevant or appropriate to the circumstance for which the mobile robots are being deployed. For example, in an aspect of the disclosure for a search-and-rescue scenario the mobile robots could be configured with video cameras or infrared thermal cameras configured to detect a person. In another aspect of the disclosure for disaster relief, the mobile robots could be configured with water, food, or supplies.

The robots are equipped with radio frequency (RF) communications equipment. The robots use RF communications equipment corresponding to the RF communications equipment which the fixed sensors use, and use the RF equipment for communicating with.

The robots and fixed sensors use RF communications to cooperatively assign, or associate, the robots to the fixed sensors according to the demand of the fixed sensors. Once a robot is associated to a fixed sensor, the robot can operate autonomously within the area of the fixed sensor, or the operation can be directed by the fixed sensor, or the operation can be a combination of the two. A robot may only be associated with one fixed sensor at a time. The present disclosure concerns the deployment of the mobile robots, and may be applied to many scenarios irrespective of the particular function of the robots once they have been deployed.

A robot is called associated if the robot is satisfying a demand of a particular fixed sensor; the robot is said to be associated to the sensor, and the sensor is characterized as the associated sensor to the robot. A robot is called unassociated if the mobile robot is not satisfying a demand of any fixed sensor. A robot which is unassociated will move in search of a fixed sensor with which the robot may associate. The manner in which the robot will move is calculated using a virtual force algorithm.

The virtual force algorithm is based on the concept of electromagnetic particles, where the particles attract or repel each other according to the particles' characteristics. Mapping the concept to sensor networks, the robots are treated as virtual particles that are subject to virtual forces. The robots can be attracted to or repelled by other robots and fixed sensors. The forces are computed based on the robot's neighbors to allow the computation of the robot's next movement. The specific algorithm for assigning virtual forces will be described below.

FIG. 1 illustrates an exemplary initial distribution of mobile robots and fixed sensors. The fixed sensors may be distributed in any manner in the present disclosure, but generally will be placed so that a range of the fixed sensors will cover the area to be monitored, and placed so that coverage overlap between fixed sensors is minimized.

Figure 2:
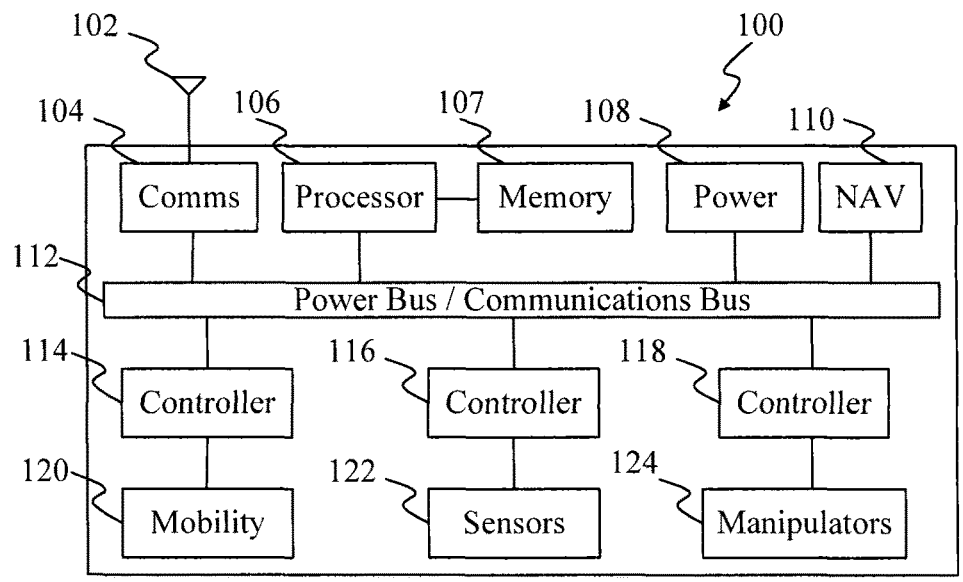
FIG. 2 illustrates an embodiment of a mobile robot.

FIG. 2 depicts a schematic view of a mobile robot 100. The mobile robot 100 is equipped with RF communications circuitry 104 and an antenna 102 appropriate to the RF circuitry. The robot 100 communicates with other robots and fixed sensors via the RF communications circuitry 104. The communications circuitry 104 can be, for example, 2G, 3G, or 4G cellular communications equipment according to standards such as Global System for Mobile Communications (GSM), Universal Mobile Telecommunications System (UMTS), Long-Term Evolution (LTE), or Advanced LTE standards. The communications circuitry 104 can also be wireless communications (Wi-Fi) circuitry, Bluetooth® circuitry, or other RF communications circuitry.

The robot 100 includes a processor 106 which performs the processes described in the present disclosure, as well as controls the various components of the mobile robot. The process data and instructions may be stored in memory 107. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the robot 100 communicates, such as a server or computer, via the RF communications circuitry 104.

Further, the claimed advancements may be provided as a utility application, background daemon, or component of an operating system, or combination thereof, executing in conjunction with the processor 106 and an operating system such as Microsoft Windows 7, UNIX, Solaris, LINUX, Apple MAC-OS and other systems known to those skilled in the art.

The hardware elements to achieve the mobile robot 100 may be realized by various circuitry elements known to those skilled in the art. For example, processor 106 may be a Xenon or Core processor from Intel of America, an Opteron processor from AMD of America, or may be other processor types that would be recognized by one of ordinary skill in the art. Alternatively, the processor 106 may be implemented on an FPGA, ASIC, PLD, or using discrete logic circuits, as one of ordinary skill in the art would recognize. Further, the processor 106 may be implemented as multiple processors cooperatively working in parallel to perform the instructions of the inventive processes described below.

A power source 108 provides power for all the systems of the mobile robot 100. The power source 108 includes one or more high energy density batteries, which may be in combinations of series and parallel configurations in order to produce the required voltage and output power. The one or more batteries in the power source 108 can include, for example, lithium-ion (Li-ion) batteries or lithium polymer (LiPo) batteries.

A navigation module 110 includes an antenna and circuitry for a Global Navigation Satellite System (GNSS), for example, the Naystar Global Positioning System (GPS) or the Global Navigation Satellite System (GLONASS), and an inertial measurement unit (IMU). The IMU is a microelectromechanical system (MEMS) equipped with three accelerometers, three gyroscopes, and three magnetometers for measuring the three components of the acceleration, the angular acceleration, and the local magnetic field, respectively. The navigation module 110 provides location and orientation information for the robot 100.

The robot 100 includes power and communications buses 112 for distributing signals and power between the component systems of the robot.

A motor controller 114 controls and drives the mobility systems 120. The mobility systems include the various components which are used by the mobile robot 100 for locomotion. The mobility systems 120 can include, for example, electric motors and rotors for an aerial robot such as a quadcopter, tracks or wheels and their motors for a ground-based mobile robot, and the like.

A sensor controller 116 is configured with controllers for each of the sensors 122 included in the mobile robot 100. The sensors 122 can include, for example, vision systems utilizing visible or infrared light, temperature sensors, sound sensors, proximity sensors, distance or range sensors, gas sensors, and the like.

A manipulator controller 118 controls the manipulators 124 with which the robot is equipped. The manipulators 124 can include, for example, a jointed robotic arm with grippers or tools, soil testers or sample collectors, and the like.

Figure 3:
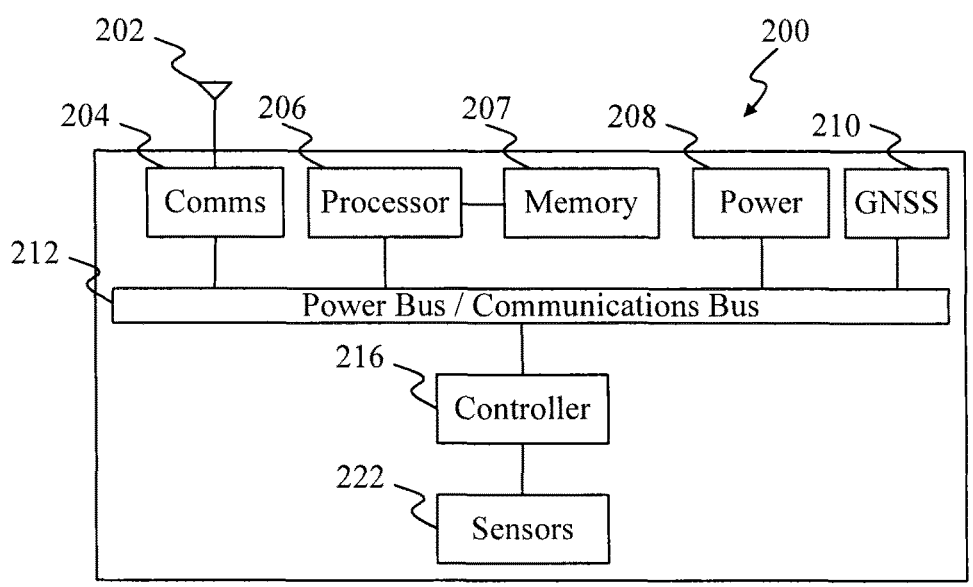
FIG. 3 illustrates an embodiment of a fixed sensor.

FIG. 3 depicts a schematic view of a fixed sensor 200. The fixed sensor 200 is equipped with RF communications circuitry 204 and an antenna 202 appropriate for the RF circuitry. The fixed sensor 200 communicates with other robots and fixed sensors via the RF communications circuitry 204. The communications circuitry 204 can be, for example, 2G, 3G, or 4G cellular communications equipment according to standards such as Global System for Mobile Communications (GSM), Universal Mobile Telecommunications System (UMTS), Long-Term Evolution (LTE), or Advanced LTE standards. The communications circuitry 204 can also be wireless communications (Wi-Fi) circuitry, Bluetooth®, or other RF communications circuitry.

The fixed sensor 200 includes a processor 206 which performs the processes described below. The process data and instructions may be stored in memory 207. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the fixed sensor 200 communicates, such as a server or computer.

Further, the claimed advancements may be provided as a utility application, background daemon, or component of an operating system, or combination thereof, executing in conjunction with the processor 206 and an operating system such as Microsoft Windows 7, UNIX, Solaris, LINUX, Apple MAC-OS and other systems known to those skilled in the art.

The hardware elements in order to achieve the fixed sensor 200 may be realized by various circuitry elements, known to those skilled in the art. For example, processor 206 may be a Xenon or Core processor from Intel of America, an Opteron processor from AMD of America, or may be other processor types that would be recognized by one of ordinary skill in the art. Alternatively, the processor 206 may be implemented on an FPGA, ASIC, PLD, or using discrete logic circuits, as one of ordinary skill in the art would recognize. Further, the processor 206 may be implemented as multiple processors cooperatively working in parallel to perform the instructions of the inventive processes described above.

A power source 208 provides power for all the systems of the fixed sensor 200. The power source 208 includes one or more high energy density batteries, which may be in combinations of series and parallel configurations in order to produce the required voltage and output power. The one or more batteries in the power source 208 can include, for example, lithium-ion (Li-ion) batteries or lithium polymer (LiPo) batteries. The power source 208 may also include a connection to mains power, in order to preserve the battery charge for the event of a loss of power, and a solar panel for battery charging.

A navigation module 210 includes an antenna and circuitry for a Global Navigation Satellite System (GNSS), for example, the Naystar Global Positioning System (GPS) or the Global Navigation Satellite System (GLONASS). The navigation module 210 provides location information for the fixed sensor 200, which is incorporated in the position-demand message, described below.

The fixed sensor 200 includes power and communications buses 212 for distributing signals and power between the component systems of the fixed sensor.

A sensor controller 216 is configured with controllers for each of the sensors 222 included in the fixed sensor 200. The sensors 222 can include, for example, vision systems utilizing visible or infrared light, temperature sensors, sound sensors, proximity sensors, distance or range sensors, gas sensors, seismic sensors, and the like. Readings from the sensors 222 are used by the processor 206 with the predetermined formula and a current number of associated robots to calculate a demand of the fixed sensor.

Figure 4:
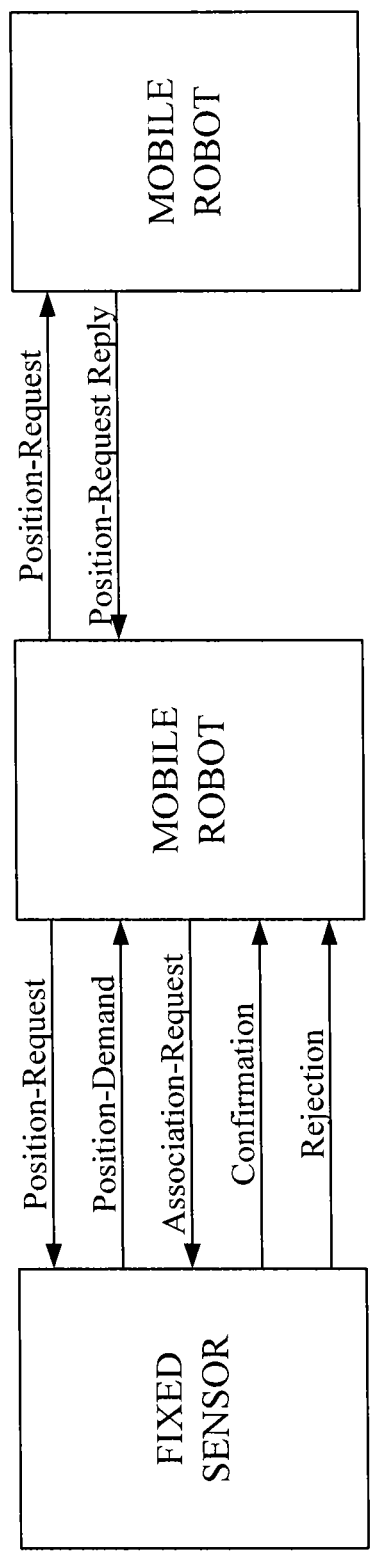
FIG. 4 illustrates an embodiment of the different types of messages used.

FIG. 4 illustrates communications between the mobile robots and fixed sensors. Each labeled arrow of FIG. 4 corresponds to a type of message, with the type of sending unit and the type of receiving unit identified.

A position-request message is a broadcast message from a mobile robot which is received by all units, both fixed sensors and mobile robots, within a communication range of the mobile robot sending the position request message. The position-request message is a request for a location and a demand from every fixed sensor within the communication range of the mobile robot.

A fixed sensor receiving a position-request message replies with a position-demand message, giving the location of the fixed sensor as determined by the GNSS and a demand, as calculated by the processor using the sensors and the predetermined formula. In a virtual force algorithm, described below, a position-demand message with a demand greater than zero will exert an attractive force, and a position-demand message with a demand equal to zero will exert a repulsive force.

A mobile robot which receives a position-request message will reply with a position-request reply message. The position-request reply message is further described below. In a virtual force algorithm, described below, the position-request reply message can exert an attractive, repulsive, or zero force.

An association-request message is sent by a mobile robot to a fixed sensor from which the mobile robot has received a position-demand message with a demand greater than zero. The demand being greater than zero indicates that the fixed sensor still has a need for robots, and the association-request message is a request by the robot to associate with the fixed sensor.

In reply to an association-request message from a robot, a fixed sensor will send a confirmation message if its demand is still greater than zero and a rejection message if its demand is equal to zero.

Figure 5:
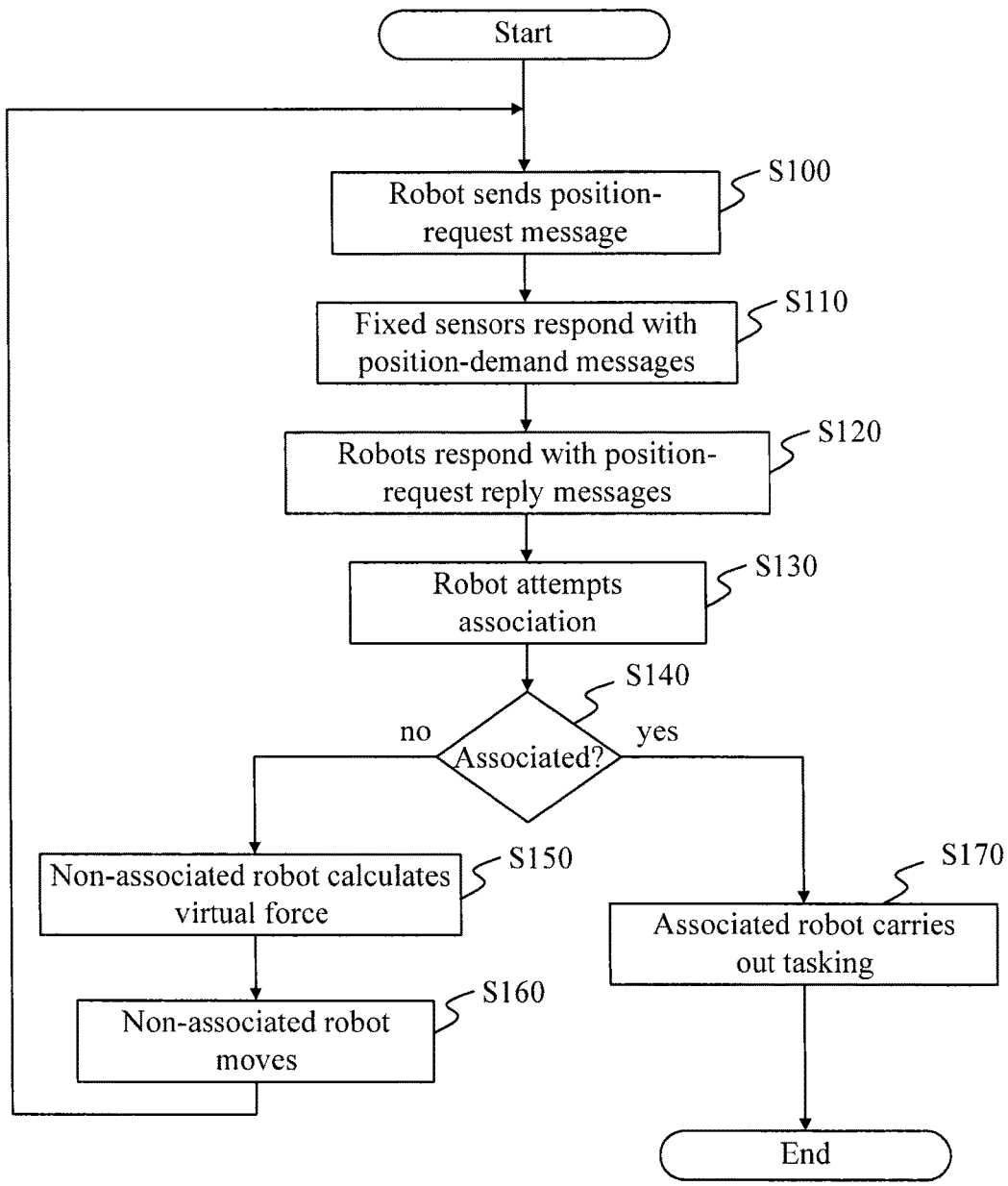
FIG. 5 is an algorithmic flowchart according to exemplary aspects of the present disclosure.

An algorithmic flowchart of a method for cooperatively deploying a robot 100 of a plurality of robots with a plurality of fixed sensors according to an exemplary aspect of the present disclosure is illustrated in FIG. 5. The method of FIG. 5 presents an overview which includes actions by both the robots and the fixed sensors. The words "unit" and "units" are used below to generically indicate fixed sensors or robots or both, without particularly specifying which set the unit or units belong to. All the steps in the method are actions or interactions involving robots and fixed sensors. Respective exemplary algorithms for the robots and fixed sensors will be detailed later in the disclosure.

The method begins at step S100 with the robot sending a position-request message. The position-request message is broadcast to every unit within the communications range of the robot 100.

At step S110, the robot 100 receives position-demand messages from the fixed sensors within the communications range of the robot 100 in response to the position-request message. Each fixed sensor which receives a position-request message from the robot replies with a position-demand message. The robot 100 stores all the position-demand messages received.

At step S120, the robot 100 receives position-request reply messages in response to the position-request message from the other robots within the communications range. Every other mobile robot which receives the position-request message from robot 100 replies with a position-request reply message. The robot 100 stores the position-request reply messages.

At step S130, the robot 100 attempts to associate with the fixed sensors from which it has received position-demand messages. The robot 100 sends an association request message to the fixed sensors, one at a time, in order of increasing distance, from the nearest to the farthest. After each association request message is sent, the robot 100 associates with the fixed sensor if a confirmation message is received from the fixed sensor, and tries the next fixed sensor if a rejection message is received or if no message is received after a predetermined period of time. The robot 100 continues attempting to associate with the fixed sensors from which it has received position-demand messages until either the robot 100 receives a confirmation message from a fixed sensor and associates with the fixed sensor, or until either a rejection message or no message has been received from every fixed sensor from which it has received a position-demand message, that is, the robot 100 remains unassociated. The case where the robot 100 remains unassociated includes a case where no position-demand messages are received by the robot 100 in response to the position-request message.

At step S140, the robot 100 determines whether the robot is associated or unassociated. If the robot 100 is associated, then the robot carries out whatever function or tasking it is assigned at step S170. If the robot 100 determines that it is not associated at step S140, then the unassociated robot calculates a virtual force from the position-request reply messages and the position-demand messages at step S150 using a virtual force algorithm. The details of the virtual force algorithm calculation are described below.

At step S160, the unassociated robot 100 moves according to the calculated virtual force. After moving, the unassociated robot 100 returns to step S100, and continues the cycle until the robot 100 successfully associates with a fixed sensor. This completes the method for cooperatively deploying the robot 100.

Next, we present algorithms for the robots and the fixed sensors, according to the method illustrated above, according to exemplary aspects of the disclosure.

Figure 6:
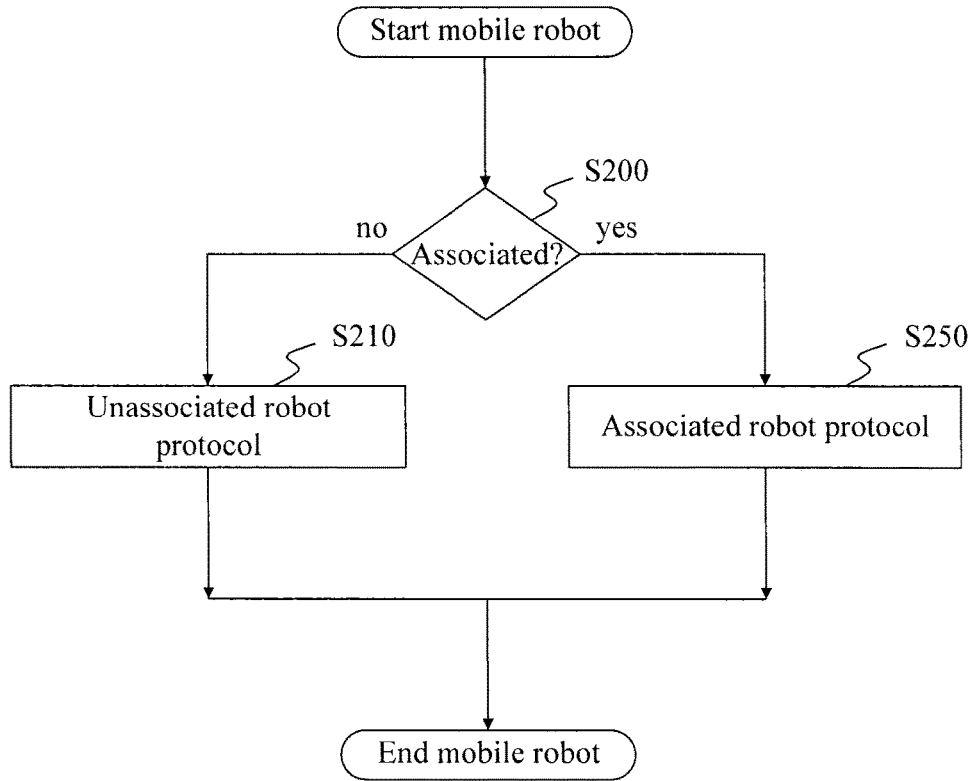
FIG. 6 is an algorithmic flowchart according to exemplary aspects of the present disclosure.

FIG. 6 gives an algorithmic flowchart of a mobile robot protocol according to an exemplary aspect of the disclosure. The mobile robot protocol is followed by all robots, and is divided into a protocol for associated robots and a protocol for unassociated robots.

At step S200, the robot 100 determines whether it is associated with a fixed sensor. If the robot 100 determines that it is not associated with a fixed sensor, then the robot follows the unassociated robot protocol at step S210. If the robot 100 determines that it is associated with a fixed sensor, then the robot follows the associated robot protocol in step S250.

The protocol of FIG. 6 may be executed continuously by the robot. This completes the mobile robot protocol according to an exemplary aspect of the disclosure.

Figure 7:
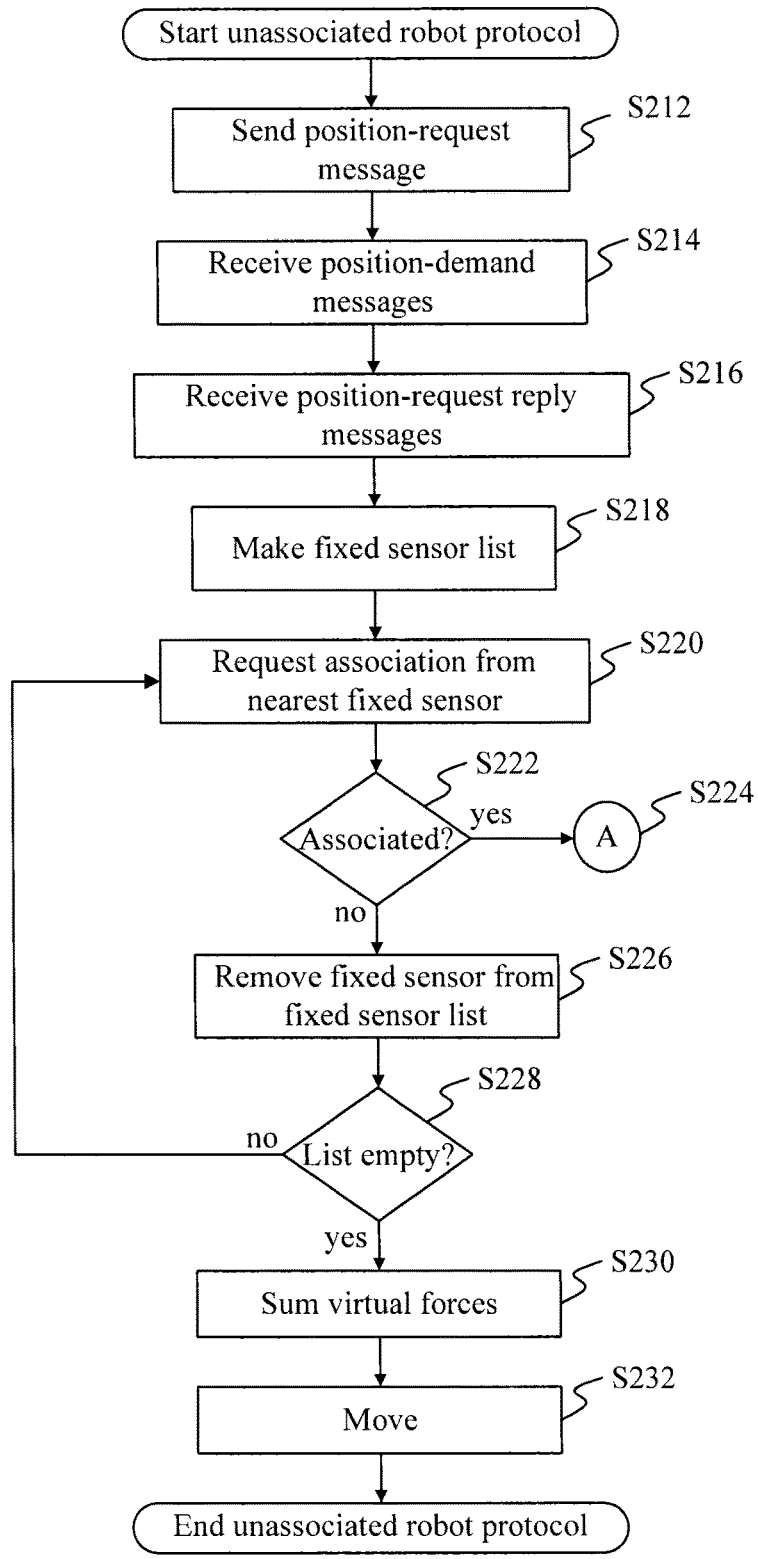
FIG. 7 is an algorithmic flowchart according to exemplary aspects of the present disclosure.

FIG. 7 gives an algorithmic flowchart of an exemplary unassociated robot protocol according to an aspect of the disclosure. This is an exemplary protocol followed by unassociated robots, and corresponds to step S210 in FIG. 6.

At step S212, the robot 100 sends a position-request message. The position-request message is broadcast to every unit within the communications range of the robot 100. This step corresponds to step S100 in the overview shown in FIG. 5.

At step S214, the robot 100 receives position-demand messages from the fixed sensors within the communications range of the robot 100 in response to the position-request message. A position-demand message is received from each fixed sensor which receives a position-request message from the robot. The robot 100 stores all the position-demand messages received. This step corresponds to step S110 in the overview shown in FIG. 5.

At step S216, the robot 100 receives position-request reply messages in response to the position-request message from the other robots within the communications range. Every other mobile robot which receives the position-request message from robot 100 replies with a position-request reply message. The robot 100 stores the position-request reply messages. This step corresponds to step S120 in the overview shown in FIG. 5.

At step S218, the robot 100 makes a fixed sensor list. The fixed sensor list is a listing of fixed sensors from which the robot received a position-demand message with a demand greater than zero, in order of increasing distance from the robot from the closest fixed sensor to the farthest fixed sensor.

At step S220, the robot 100 sends an association request message to the first fixed sensor on the fixed sensor list. At step S222, the robot 100 determines whether the response from the first fixed sensor is a confirmation message, and the robot is associated with the fixed sensor, or a rejection message, and the robot remains unassociated. If it is determined at step S222 that the robot 100 is associated, then at step S224 the robot transitions to the associated robot protocol, illustrated in FIG. 8. If it is determined at step S222 that the robot 100 did not associate, then at step S226 the robot removes the first fixed sensor from the fixed sensor list. The case where the robot did not associate includes a case where no association message or rejection message is received after a predetermined time.

At step S228 the robot 100 determines whether the fixed sensor list is now empty. If the fixed sensor list is not empty, then the robot 100 returns to step S220 and continues to request association from the fixed sensors until either it receives a confirmation message or the list becomes empty.

If the robot determines that the fixed sensor list is empty at step S228, then at step S230 the robot 100 sums the virtual forces from the position-request reply messages and the position-demand messages from the fixed sensors using a virtual force algorithm.

The virtual force algorithm combines ideas from potential fields and from disc packing problems. Each unit within a communication range of a mobile robot acts as a "source" for the mobile robot. The force can be either positive (i.e., attractive), zero, or negative (i.e., repulsive). The rule for determining the force on a mobile robot depends on whether the unit is an unassociated robot, or a fixed sensor or associated robot.

In the case when the unit is an unassociated robot, whether the force is repulsive or attractive depends on a threshold distance. If the unit is less than the threshold distance from the mobile robot, i.e., the mobile robot and the unit are closer than the threshold distance, then the force will be repulsive. If the unit is greater than the threshold distance from the mobile robot, i.e., the mobile robot and the unit are farther apart than the threshold distance, then the force will be attractive. If the distance between the unit and the mobile robot is equal to the threshold distance, then the force exerted on the mobile robot by the unit is zero.

Thus, the threshold distance establishes an equilibrium spacing, which would be a natural spacing of the robots if there were no fixed sensors present. The threshold spacing is an arbitrary, but predetermined, parameter which may be adjusted according to the area to be covered, the number of mobile robots available, and the like, in order to optimize a performance of the algorithm.

In the case where the unit is a fixed sensor or an associated robot, whether the force is repulsive or attractive depends on whether the fixed sensor, or a nearby fixed sensor, has a demand greater than zero.

The force terms and the virtual force algorithm are further described below with reference to FIG. 9.

After the individual virtual forces have been calculated and summed into a resultant force, at step S232 the mobile robot 100 moves according to the resultant force. The resultant force may be indicated as either a direction, or a direction and a magnitude. In one aspect of the disclosure, the unassociated robot continues to broadcast position-request messages, and travels in the direction corresponding to θ until a position-demand message or a position-request reply message is received. In another aspect of the disclosure, the unassociated robot moves a distance d along the direction θ first, and then broadcasts a position-request message.

The completes the unassociated robot protocol. This protocol can be repeated as many times as necessary until the mobile robot 100 associates with a fixed sensor.

Figure 8:
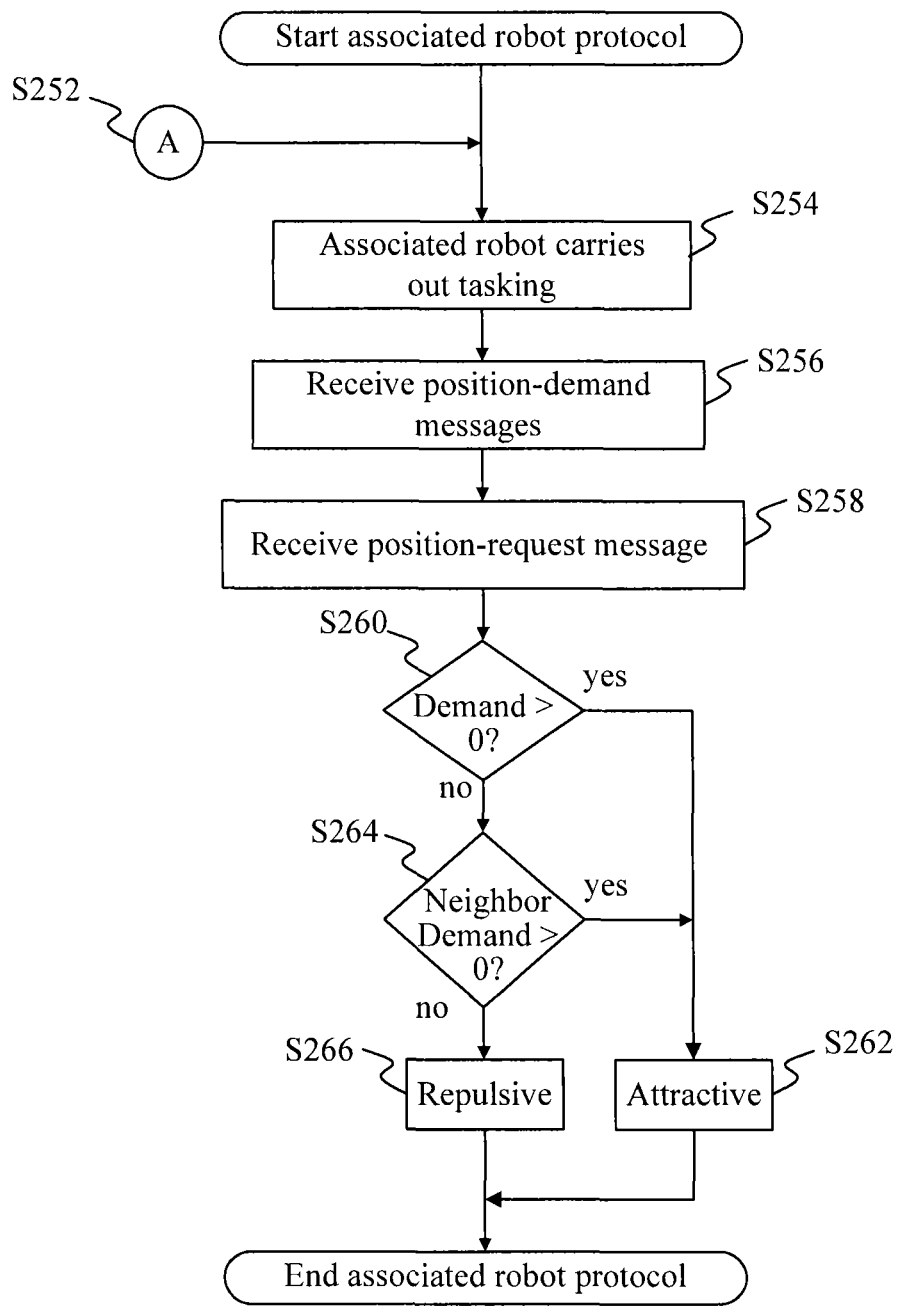
FIG. 8 is an algorithmic flowchart according to exemplary aspects of the present disclosure.

Having given an exemplary protocol for the unassociated robots, we now turn to an exemplary protocol for the associated robots. An algorithmic flowchart of an exemplary protocol for the associated robots in an aspect of the disclosure is illustrated in FIG. 8. This is an exemplary protocol followed by associated robots, and corresponds to step S250 in FIG. 6.

S252 shows the robots which have received a confirmation to associate with a fixed sensor transitioning from the unassociated robot protocol described in FIG. 7 to the associated robot protocol described in FIG. 8.

At step S254, the associated robot carries out its tasking. The tasking may be programmed into the robot, received from the fixed sensor to which the robot is associated, or a combination of the two.

At step S256, the associated robots receives position-demand messages which are broadcast from fixed sensors. The position-demand messages are broadcast by the fixed sensors to unassociated robots in response to position-request messages. The associated robot stores any received position-demand messages in order to determine the demand of the fixed sensors around it.

At step S258, the associated robot receives a position-request message broadcast from an unassociated robot. At step S260, the associated robot determines, using the received position-demand messages, whether the demand of the fixed sensor to which it is associated is greater than zero. If it is determined that the demand is greater than zero, then at step S262 the associated sensor sends a position-demand message corresponding to its associated fixed sensor, which will also act as an attractive force in the virtual force algorithm.

If it is determined that the demand of the fixed sensor to which the robot is associated has a demand which is not greater than zero, then at step S264 the associated robot determines, using the received position-demand messages, whether a neighboring fixed sensor has a demand greater than zero. If it is determined that a neighboring fixed sensor has a demand greater than zero, then at step S262 the associated sensor sends a position-demand message corresponding to the neighboring fixed sensor having a greatest demand, which will also act as an attractive force in the virtual force algorithm.

If the associated robot determines at step S264, from the received position-demand messages, that no fixed sensor in the neighborhood of the associated robot has a demand greater than zero, then at step S266 the associated robot sends a position-demand to the unassociated robot which has zero demand, and therefore acts as a repulsive force in the virtual force algorithm.

This completes the associated robot protocol. This protocol can be executed continuously while the associated robot carries out its tasking.

Figure 9:
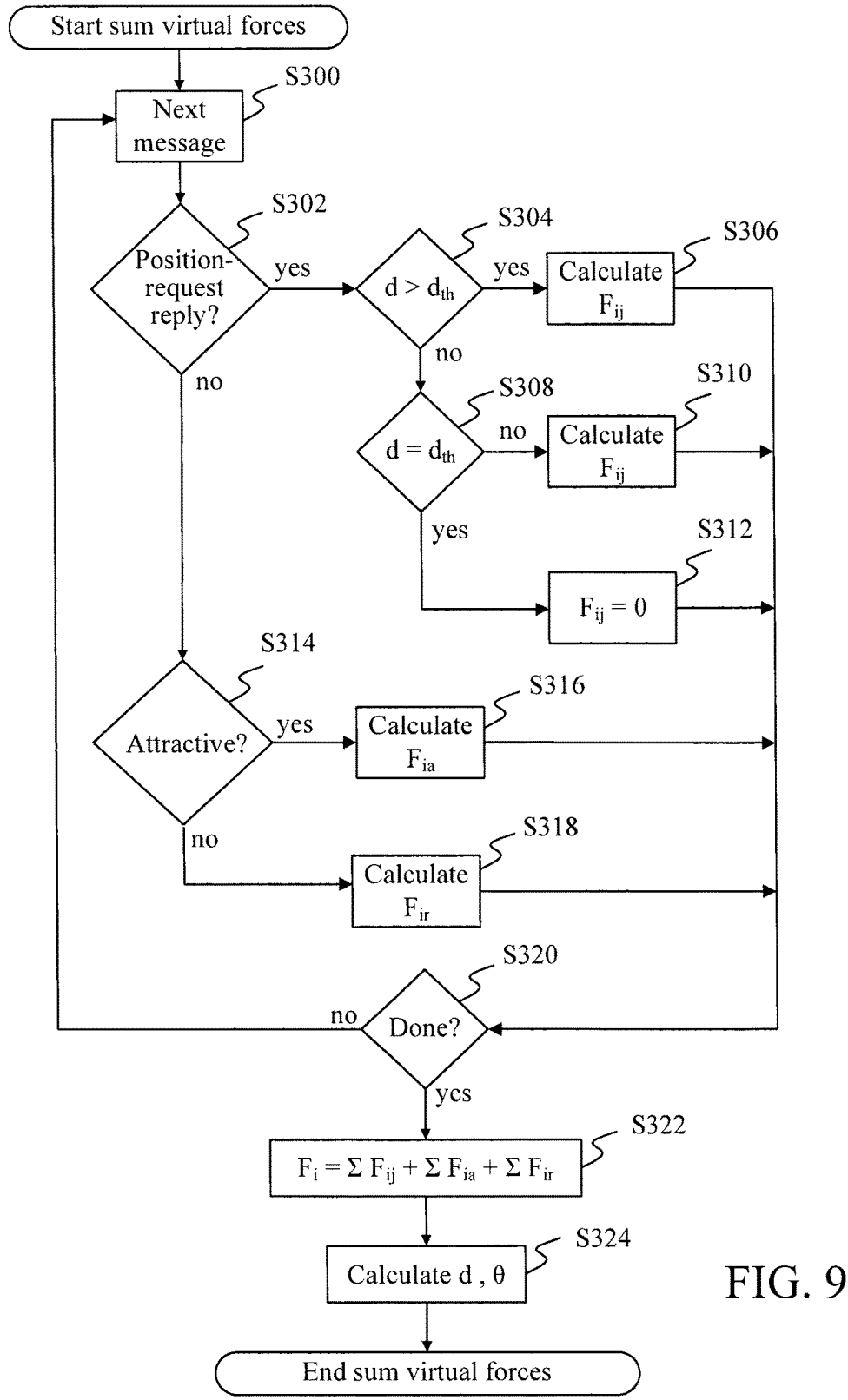
FIG. 9 is an algorithmic flowchart according to exemplary aspects of the present disclosure.

An exemplary virtual force algorithm according to an aspect of the disclosure is illustrated in FIG. 9. The definition and summing of the virtual forces according to the virtual force algorithm illustrated in FIG. 9 corresponds to step S230 of the illustrative algorithm depicted in FIG. 7. At the beginning of the execution of the virtual force algorithm, the unassociated robot has received a set of responses to its broadcast position-request message. The responses are either position-demand messages or position-request reply messages. After failing to associate to any fixed sensor, the virtual force algorithm is executed by unassociated robots in order to determine how to move in order to discover new fixed sensors to associate with.

At step S300 the unassociated robot starts by moving to a first message of the stored position-demand messages and position-request reply messages as a current message.

At step S302, the unassociated robot determines whether the current message is a position-request reply message. If the robot determines that the current message is a position-request reply message, then the robot proceeds to step S304.

At step S304, the unassociated robot determines whether a distance from the robot's current location to the position in the position-request reply message is greater than a predetermined threshold distance. If the unassociated robot determines that the distance is greater than the threshold distance, then at step S306 the unassociated robot calculates a corresponding attractive force F. The unassociated robot then moves to step S320 of the algorithm.

If the unassociated robot determines at step S304 that the distance is not greater than the predetermined threshold distance, then at step S308 the robot determines whether the distance is equal to the threshold distance. If the unassociated robot determines that the distance is not equal to the threshold distance, i.e., the distance is less than the threshold distance, then the robot proceeds to step S310 and calculates a corresponding repulsive force F. The unassociated robot then moves to step S320 of the algorithm.

If at step S308 the unassociated robot determines that the distance is equal to the threshold distance, then at step S312 the robot sets the corresponding force F to be zero. The unassociated robot then moves to step S320 of the algorithm.

In one aspect of the present disclosure, the force $F_{ij}$ on the $i^{th}$ mobile robot due to the $j^{th}$ unassociated robot due to a position-request reply message is given by $$F_{ij} = \begin{cases} w_a * (d_{ij} - d_{th}), & \theta_{ij} \quad d_{ij} > d_{th} \\ 0 & d_{ij} = d_{th} \\ w_r * \dfrac{1}{d_{ij}}, & \pi - \theta_{ij} \quad d_{ij} < d_{th} \end{cases}$$

where $d_{ij}$ is the distance between the $i^{th}$ robot and the $j^{th}$ robot, $d_{th}$ is the threshold distance, $\theta_{ij}$ is an angle of a line between the $i^{th}$ robot and the $j^{th}$ robot, and $\pi$ is pi (the ratio of the circumference of a circle to its diameter). The attractive weighting and repulsive weighting constants $w_a$ and $w_r$, respectively, are given by $$w_a = \dfrac{d_{th}}{c_{th}} * (\text{number of robots})^{-\alpha}$$

$$w_r = (\text{number of robots})^{\alpha}$$

where $c_{th}$ is a threshold communications distance, for example, the maximum communication range of a mobile sensor, a is an arbitrary but predetermined tuning parameter, e.g., $\alpha$ can take the value 1, and "number of robots" represents a number of mobile robots. Increasing the value of a increases the repulsive force and decreases the attractive force. Decreasing the value of a decreases the repulsive force and increases the attractive force.

If the unassociated robot determines at step S302 that the current message is not a position-request reply message, then the unassociated robot moves to step S314. If the current message is not a position-request reply message, then the current message is necessarily a position-demand message.

At step S314, the unassociated robot determines whether the demand of the current message is greater than zero, which results in an attractive force. If the force is attractive, then at step S316 the unassociated robot calculates a corresponding attractive force F. If the demand of the current message is not greater than zero, then at step S318 the unassociated robot calculates a corresponding repulsive force F. The unassociated robot then moves to step S320 of the algorithm.

In one aspect of the present disclosure, the attractive and repulsive forces $F_{ia}$ and $F_{ir}$ on the $i^{th}$ mobile robot due to an associated robot or a fixed sensor are given by $$F_{ia} = w_a * d_{ia}$$

$$w_a = (\text{number of robots})^{-1} * \text{demand}$$

$$F_{ir} = \beta * \dfrac{w_r}{d_{ir}}$$

$$w_r = (\text{number of robots})^{\alpha}$$

where $F_{ia}$ is the attractive force due, $F_{ir}$ is the repulsive force, $w_a$ is an attractive weighting factor, $w_r$ is a repulsive weighting factor, demand is the demand of the fixed sensor, $d_{ia}$ and $d_{ir}$ are the distance to the fixed sensor or the associated robot for the attractive force term and the repulsive force term, respectively, $\alpha$ is an arbitrary but predetermined tuning parameter described above, and $\beta$ is an arbitrary but predetermined tuning parameter controlling the strength of the repulsion. Setting $\beta$ to a higher value will increase the repulsion of the mobile robot by associated robots and fixed sensors having zero demand, and conversely setting $\beta$ to a lower value will decrease the repulsion of the mobile robot by associated robots and fixed sensors having zero demand.

At step S320, the unassociated robot determines whether all the stored position-demand messages and position-request reply messages have been processed. If it is determined by the robot that not all the messages have been processed, then the unassigned robot returns to step S300 to process the next message. If it is determined at step S320 that all the messages have been processed, then the robot proceeds to step S322.

At step S322, the unassociated robot calculates a resultant force. The resultant force is a sum of all the individual forces calculated from the stored position-demand and position-request reply messages.

At step S324, the unassociated robot calculates a magnitude, d, and a direction angle, $\theta$, of the resultant force from step S322. The direction angle $\theta$ can be calculated relative to any reference direction, for example, North. The direction angle $\theta$ will be used to determine a corresponding direction of travel for the unassociated robot to move in search of fixed sensors with a non-zero demand. In one aspect of the disclosure, the unassociated robot continues to broadcast position-request messages, and travels in the direction corresponding to $\theta$ until a position-demand message or a position-request reply message is received. In another aspect of the disclosure, the unassociated robot moves a distance d along the direction $\theta$ first, and then broadcasts a position-request message.

This completes the exemplary sum of the virtual forces algorithm according to the virtual force algorithm.

Figure 10:
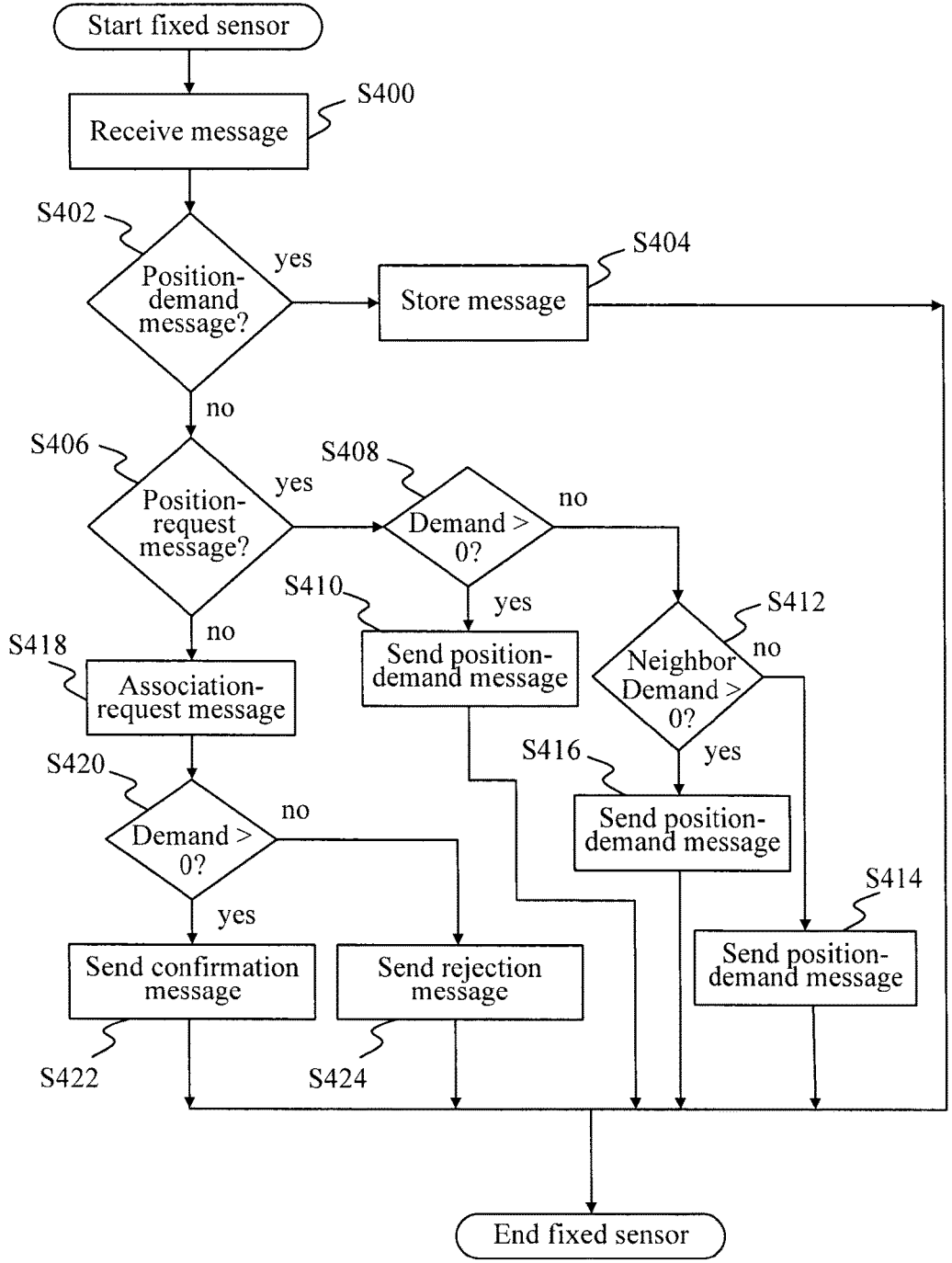
FIG. 10 is an algorithmic flowchart according to exemplary aspects of the present disclosure.

Having given exemplary protocols for the mobile robots, we now turn to an exemplary protocol for the fixed sensors. An algorithmic flowchart for an exemplary protocol for the fixed sensors in an aspect of the disclosure is illustrated in FIG. 10.

At step S400, the fixed sensor receives a message. At step S402, the fixed sensor determines whether the message is a position-demand message broadcast from another fixed sensor. If the fixed sensor determines that the message is a position-demand message, then at step S404 the fixed sensor stores the position-demand message. The details of the position-demand messages from the other fixed sensors are saved for use in responding to later position-request messages.

If at step S402 the fixed sensor determines that the message is not a position-demand message, then at step S406 the fixed sensor determines whether the message is a position-request message from an unassociated robot. If it is determined by the fixed sensor that the message is a position-request message, then at step S408 the fixed sensor determines whether its demand is greater than zero.

If at step S408 the fixed sensor determines that its demand is greater than zero, then at step S410 the fixed sensor broadcasts a position-demand message including the fixed sensor's position and demand. The fixed sensor calculates the demand from monitoring results and a predetermined formula, and subtracts the number of robots already associated with the fixed sensor. The position-demand message, having a demand greater than zero, also acts as an attractive force if a mobile sensor which receives it executes the virtual force algorithm.

If at step S408 the fixed sensor determines that its demand is not greater than zero, then at step S412 the fixed sensor determines whether a demand of any of its neighboring fixed sensors is greater than zero, using the saved details of the received position-demand messages. If it is determined that none of the neighboring fixed sensors has a demand greater than zero, then at step S414 the fixed sensor sends a position-demand message with zero demand, which also acts as a repulsive force if the mobile sensor executes the virtual force algorithm.

If at step S412 the fixed sensor determines that a neighboring fixed sensor's demand is greater than zero, then at step S416 the fixed sensor sends a position-demand message corresponding to a neighboring fixed sensor having the greatest demand. The position-demand message, having a demand greater than zero, also acts as an attractive force if a mobile sensor which receives it executes the virtual force algorithm.

If at step S406 the fixed sensor determines that the message is not a position-request message, then at step S418 the fixed sensor determines that the message is an association request message. At step S420, the fixed sensor determines whether its demand is greater than zero. The fixed sensor calculates the demand from monitoring results and the predetermined formula, and subtracts the number of robots already associated with the fixed sensor.

If the fixed sensor determines that its demand is greater than zero, then at step S422 the fixed sensor sends a confirmation message to the unassociated robot. If the fixed sensor determines that its demand is not greater than zero, then at step S424 the fixed sensor sends a rejection message to the unassociated robot.

The exemplary protocol of FIG. 10 can be executed continuously by fixed sensors. This ends the fixed sensor protocol.

While certain embodiments have been described herein, these embodiments are presented by way of example only, and are not intended to limit the scope of the disclosure. Indeed, using the teachings in this disclosure, a person having ordinary skill in the art could modify and adapt the disclosure in a various ways, making omissions, substitutions and changes in the form of the embodiments described herein without departing from the spirit of the disclosure. The accompanying claims and their equivalents are intended to cover such forms or modifications as would fall within the scope and spirit of the disclosure.

For example, instead of a fixed sensor list being maintained by the mobile robots, the mobile robots can simply make a determination as needed as to which fixed sensor from which it has received a position-demand message is the closest.

Also, the specific equations presented for the individual virtual force terms in the virtual force algorithm could be altered in many ways by one of ordinary skill in the art, as long as the repulsive and attractive characteristics are maintained for each type of force.

We claim:

1. A method of cooperatively deploying a mobile robot of a plurality of mobile robots with a plurality of fixed sensors, the method comprising:
   broadcasting, by the mobile robot of the plurality of mobile robots, a position-request message, the position-request message including a request for a position and a demand for mobile robots;
   receiving, by at least one fixed sensor of the plurality of fixed sensors, the position-request message from the mobile robot;
   transmitting, by the at least one fixed sensor, a position-demand message to the mobile robot, the position-demand message including the position of the at least one fixed sensor and the demand for mobile robots at the position of the at least one fixed sensor, the demand for mobile robots being a number greater than or equal to zero;
   receiving, by the mobile robot, one or more position-demand messages, each position-demand message being from a corresponding fixed sensor of the plurality of fixed sensors within a range of the position-request message;
   determining, by the mobile robot, for each of the one or more position-demand messages, a distance to the corresponding fixed sensor;
   storing, by the mobile robot, for each position-demand message having the demand with a number greater than zero, information for the corresponding fixed sensor in a fixed sensor list when the distance to the corresponding fixed sensor is less than a predetermined distance;
   determining, by the mobile robot, a closest fixed sensor using the information stored in the fixed sensor list;
   transmitting, by the mobile robot, an association request message to the closest fixed sensor;
   receiving, by the closest fixed sensor, the association request message from the mobile robot; and
   transmitting, by the closest fixed sensor, a confirmation message to the mobile robot when the demand of the closest fixed sensor is not equal to zero, or transmitting, by the closest fixed sensor, a rejection message to the mobile robot when the demand of the closest fixed sensor is equal to zero.

2. The method recited in claim 1, further comprising:
   determining, by the at least one fixed sensor, a demand of a neighboring fixed sensor of the plurality of fixed sensors,
   wherein, the position-demand message transmitted by the at least one fixed sensor corresponds to the at least one fixed sensor when the demand of the at least one fixed sensor is greater than zero, and the position-demand corresponds to the neighboring fixed sensor when the demand of the at least one fixed sensor is equal to zero.

3. The method recited in claim 2, further comprising:
   Receiving, by the at least one fixed sensor, a position-demand message from the neighboring fixed sensor,
   Wherein the demand of the neighboring fixed sensor is determined from the position-demand message from the neighboring fixed sensor.

4. The method recited in claim 1, further comprising:
   monitoring, by each of the plurality of fixed sensors, a respective local area;
   calculating, by each of the plurality of fixed sensors, a number of mobile robots required according to a result of the monitoring of the respective local area and a predetermined algorithm; and
   determining, by each of the plurality of fixed sensors, a demand that is a difference between the number of mobile robots required as determined by the calculating by each of the plurality of fixed sensors and a number of mobile robots associated with each of the plurality of fixed sensors, respectively.

5. The method recited in claim 1, further comprising:
   receiving, by the mobile robot, the rejection message from the closest fixed sensor;
   determining, by the mobile robot, a next closest fixed sensor using the information stored in the fixed sensor list; and
   transmitting, by the mobile robot, an association request message to the next closest fixed sensor.

6. The method recited in claim 1, further comprising:
obtaining, by the mobile robot, a demand of a first fixed sensor of the plurality of fixed sensors and a demand of a second fixed sensor of the plurality of fixed sensors;
receiving, by the mobile robot, a position-request message from another mobile robot of the plurality of mobile robots; and
transmitting, by the mobile robot, a position-request reply message according to the demand of the first fixed sensor and the demand of the second fixed sensor.

7. The method recited in claim 6, further comprising:
determining, by the mobile robot, a fixed sensor having a greatest demand from the first fixed sensor and the second fixed sensor; and
transmitting, by the mobile robot, a position-demand message corresponding to the fixed sensor having the greatest demand.

8. The method recited in claim 1, further comprising:
calculating, by the mobile robot, a direction based on the one or more position-demand messages; and
moving the mobile robot in the calculated direction.

9. The method recited in claim 8, further comprising:
calculating, by the mobile robot, a distance magnitude based on the one or more position-demand messages, and
moving the mobile robot for the calculated distance magnitude and in the calculated direction.

10. The method recited in claim 1,
wherein the predetermined distance is proportional to a communication range of the mobile robot.

11. A cooperative system comprising:
a plurality of fixed sensors, each fixed sensor including:
    a transmitter configured to transmit radio-frequency communications,
    a receiver configured to receive radio-frequency communications, and
    circuitry; and
a plurality of mobile robots, each mobile robot including:
    a transmitter configured to transmit radio-frequency communications,
    a receiver configured to receive radio-frequency communications, and
    circuitry,
wherein the circuitry of each fixed sensor is configured to:
    receive a position-request message from a mobile robot of the plurality of mobile robots, the position-request message being a broadcast including a request for a position and a demand for mobile robots,
    transmit a position-demand message to the mobile robot, the position-demand message including the position of the fixed sensor and the demand for mobile robots at the position of the fixed sensor, the demand being a number greater than or equal to zero,
    receive an association request message from the mobile robot,
    transmit a confirmation message to the mobile robot when the demand of the fixed sensor is not equal to zero, or transmit a rejection message to the mobile robot when the demand of the fixed sensor is equal to zero, and
wherein the circuitry of each mobile robot is configured to:
    broadcast the position-request message,
    receive one or more position-demand messages, each position-demand message being from a corresponding fixed sensor of the plurality of fixed sensors within a range of the position-request message,
    determine for each of the one or more position-demand messages, a distance to the corresponding fixed sensor,
    store, for each position-demand message having the demand with a number greater than zero, information for the corresponding fixed sensor in a fixed sensor list when the distance to the corresponding fixed sensor is less than a predetermined distance,
    determine a closest fixed sensor using the information stored in the fixed sensor list, and
    transmit the association request message to the closest fixed sensor.

12. The cooperative system as recited in claim 11, wherein the circuitry of each fixed sensor of the plurality of fixed sensors is further configured to:
    determine a demand of a neighboring fixed sensor of the plurality of fixed sensors,
    wherein the position-demand message transmitted by the circuitry corresponds to the fixed sensor when the demand of the fixed sensor is greater than zero and corresponds to the neighboring fixed sensor when the demand of the fixed sensor is equal to zero.

13. The cooperative system recited in claim 12, wherein the circuitry of each fixed sensor of the plurality of fixed sensors is further configured to:
    receive a position-demand message from the neighboring fixed sensor,
    wherein the demand of the neighboring fixed sensor is determined from the position-demand message from the neighboring fixed sensor.

14. The cooperative system as recited in claim 11, wherein the circuitry of each fixed sensor of the plurality of fixed sensors is further configured to:
    monitor a local area to a respective fixed sensor,
    determine a number of mobile robots required according to results of the monitoring of the local area and a predetermined algorithm, and
    calculate a demand for the respective fixed sensor that is a difference between the determined number of mobile robots required and a number of mobile robots associated with the respective fixed sensor.

15. The cooperative system as recited in claim 11, wherein the circuitry of each mobile robot of the plurality of mobile robots is further configured to:
    receive the rejection message from the closest fixed sensor,
    determine a next closest fixed sensor using the information stored in the fixed sensor list, and
    transmit an association request message to the next closest fixed sensor.

16. The cooperative system as recited in claim 11, wherein the circuitry of each mobile robot of the plurality of mobile robots is further configured to:
    obtain a demand of a first fixed sensor of the plurality of fixed sensors and a demand of a second fixed sensor of the plurality of fixed sensors;
    receive a position-request message from another mobile robot of the plurality of mobile robots; and
    transmit a position-request reply message according to the demand of the first fixed sensor and the demand of the second fixed sensor.

17. The cooperative system as recited in claim 16, wherein the circuitry of each mobile robot of the plurality of mobile robots is further configured to:
    determine a fixed sensor having a greatest demand from the first fixed sensor and the second fixed sensor; and transmit a position-demand message corresponding to the fixed sensor having the greatest demand.

18. The cooperative system as recited in claim 11, wherein the circuitry of each mobile robot of the plurality of mobile robots is further configured to:
- calculate a direction based on the one or more position-demand messages; and
- cause the mobile robot to move in the calculated direction.

19. The cooperative system as recited in claim 18, wherein the circuitry of each mobile robot of the plurality of mobile robots is further configured to:
- calculate a distance magnitude based on the one or more position-demand messages and
- cause the mobile robot to move for the calculated distance magnitude and in the calculated direction.

20. The method recited in claim 11, wherein the circuitry of each mobile robot of the plurality of mobile robots is configured to store the predetermined distance for the fixed sensor list so that the predetermined distance is proportional to a communication range of the mobile robot.

* * * * *